United States Patent [19]

Flotow

[11] Patent Number: 4,919,243

[45] Date of Patent: Apr. 24, 1990

[54] CLUTCH BRAKE HAVING SEGMENTED COVER SURFACES

[75] Inventor: Richard A. Flotow, Butler, Ind.

[73] Assignee: Dana Corporation, Toledo, Ohio

[21] Appl. No.: 320,905

[22] Filed: Mar. 8, 1989

Related U.S. Application Data

[63] Continuation of Ser. No. 28,935, Mar. 23, 1987, abandoned.

[51] Int. Cl.[5] .............................................. F16D 67/02
[52] U.S. Cl. ................................ 192/18 R; 192/13 R; 192/107 R; 192/107 M; 29/463; 29/511; 29/520
[58] Field of Search ................ 192/13 R, 18 R, 107 R, 192/107 M, 18 A; 29/510, 511, 520, 463; 285/365, 407; 403/274

[56] References Cited

U.S. PATENT DOCUMENTS

| | | | |
|---|---|---|---|
| 1,043,412 | 11/1912 | Faunce | 285/407 |
| 1,527,293 | 2/1925 | Bonner | 192/107 R X |
| 1,969,041 | 8/1934 | Seabury et al. | 192/107 M X |
| 2,065,480 | 12/1936 | Soper | 285/407 |
| 2,191,460 | 2/1940 | Fisher | 192/107 M |
| 2,215,723 | 9/1940 | Jones | 419/2 |
| 2,289,787 | 7/1942 | Kaschke et al. | 419/2 |
| 2,389,061 | 11/1945 | Kuzmick | 192/107 M X |
| 2,389,772 | 11/1945 | Gilbert | 192/70.14 |
| 2,435,511 | 2/1948 | Rice | 148/12.4 |
| 2,464,437 | 3/1949 | Dasher | 192/107 M X |
| 2,850,118 | 9/1958 | Byers | 192/107 R X |
| 3,073,424 | 1/1963 | Russell | 192/113 BH |
| 3,180,470 | 4/1965 | Binder | 192/107 M |
| 3,264,726 | 8/1966 | Storchheim et al. | 419/23 |
| 3,722,643 | 3/1973 | Kempf et al. | 192/13 R |
| 3,763,977 | 10/1973 | Sink | 192/18 R |
| 3,787,205 | 1/1974 | Church | 419/23 |
| 3,802,849 | 4/1974 | Kimura et al. | 192/107 M X |
| 3,948,364 | 4/1976 | Lowey | 192/107 M |
| 4,043,437 | 8/1977 | Taylor | 192/13 R |
| 4,186,826 | 2/1980 | MacKendrick et al. | 192/13 R |
| 4,286,694 | 9/1981 | Wiseman, Jr. et al. | 188/71.5 |
| 4,391,641 | 7/1983 | Lloyd | 106/36 |
| 4,396,100 | 8/1983 | Eltze | 192/70.12 |
| 4,409,298 | 10/1983 | Albertson et al. | 428/614 |
| 4,438,004 | 3/1984 | Myers | 252/12 |
| 4,565,274 | 1/1986 | Cameron | 192/107 R |
| 4,653,624 | 3/1987 | Mader | 192/58 B |
| 4,657,124 | 4/1987 | Flotow | 192/13 R |
| 4,695,080 | 9/1987 | Oetiker | 285/365 |
| 4,762,215 | 8/1988 | Flotow et al. | 192/107 C |

FOREIGN PATENT DOCUMENTS

| | | | |
|---|---|---|---|
| 59-38305 | 3/1984 | Japan . | |
| 8402483 | 7/1984 | PCT Int'l Appl. . | |
| 158999 | 5/1957 | Sweden | 285/365 |
| 2109499 | 6/1983 | United Kingdom | 192/13 R |

OTHER PUBLICATIONS

SAE Tech. Paper No. 850458 (Powder Metal Parts for Automotive Applications).
ABEX Corp. Publication dated 1966 (576610).

Primary Examiner—Leslie A. Braun
Assistant Examiner—David A. Testardi
Attorney, Agent, or Firm—MacMillan, Sobanski & Todd

[57] ABSTRACT

An improved structure for a clutch brake is disclosed. Powdered metal, such as powdered steel, is initially pressed into a preform having a desired configuration for each of a pair of opposed covers for the clutch brake. The configuration of the outer surface of each of the preforms includes a plurality of embossed segments, which alternate with non-raised areas, arranged in an annular array. The embossed segments of the covers are the portions thereof which are frictionally engaged during use. Each of the segments is defined by inner and outer circumferentially extending sides connected by a pair of generally radially extending ends. The intermediate portions of both of the ends can be curved circumferentially inwardly toward one another to form a concave region. The covers together form an internal cavity in which inner and outer brake washers are disposed. A wave washer is also disposed within the cavity and includes a plurality of waves which abut against an internal surface of the cover only opposite the non-raised areas.

12 Claims, 3 Drawing Sheets

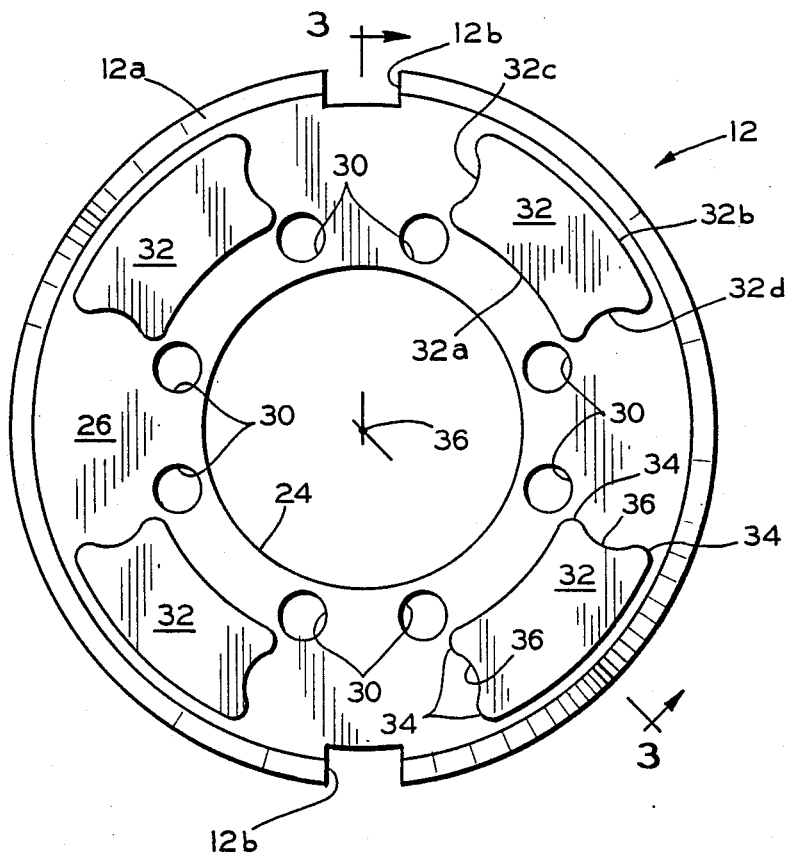
FIG. 2
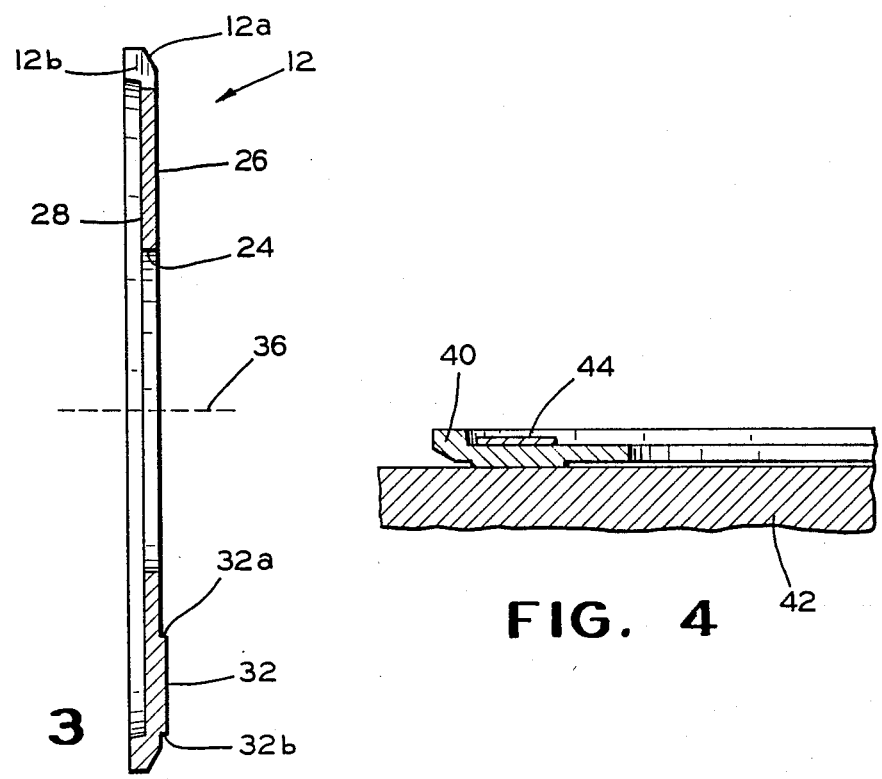
FIG. 3
FIG. 4

CLUTCH BRAKE HAVING SEGMENTED COVER SURFACES

CROSS REFERENCE TO RELATED APPLICATION

This is a continuation of application Ser. No. 07/028,935, filed March 23, 1987, now abandoned.

BACKGROUND OF THE INVENTION

The present invention relates in general to vehicular friction clutch and transmission structures and in particular to an improved clutch brake which is adapted for use in such a structure. The present invention also relates to an improved method for manufacturing the clutch brake.

In vehicular drive trains, it is well known to utilize a friction clutch to temporarily disconnect an engine from a transmission in order to permit the transmission to perform a gear shifting operation. Prior to such a gear shifting operation, gears to be mated together within the transmission are driven by the engine at different rotational speeds. The clutch is disengaged so that the mating gears are not continued to be driven by the engine and, therefore, can be aligned with one another prior to the gear shifting operation. This pre-shifting alignment prevents undesirable clashing of the gear teeth. However, in a non-synchronized transmission, the input shaft to the transmission (which is the output shaft from the clutch) continues to rotate for a period of time after the clutch has been disengaged because of momentum. Accordingly, in such non-synchronized transmissions, it is necessary to provide some means for slowing or stopping the rotation of the input shaft to the transmission when the clutch is disengaged to permit the alignment of the gears as described above.

The clutch brake is a device which is well known in the art for slowing or stopping the rotation of the input shaft to the transmission when the clutch is disengaged. The clutch brake is disposed about the input shaft between the rearward end of the clutch and the forward end of the transmission. The clutch brake is mounted on the input shaft for rotation therewith. Limited axial movement of the clutch brake along the input shaft, however, is permitted. A release mechanism of the clutch is also slidably mounted about the input shaft for limited axial movement. The release mechanism is movable between engaged and disengaged positions for selectively connecting and disconnecting the input shaft to the engine. When moved to the disengaged position, the release mechanism slides rearwardly toward the forward end of the transmission. Such movement causes the clutch brake to be frictionally engaged between the release mechanism of the clutch and the forward end of the transmission. As a result, rotation of the clutch brake, as well as of the input shaft to the transmission, is slowed or stopped.

In the past, clutch brakes of the type described above have been formed having a pair of opposed metallic covers adapted to respectively engage the release mechanism of the clutch and the forward end of the transmission. Each of the covers included an annular strip of fibrous friction facing material adhered thereto. Such friction facings were subject to wear resulting from heat build-up and repetitive usage during the frictional engagement described above. Accordingly, it would be desirable to provide an improved clutch brake which overcomes these drawbacks.

SUMMARY OF THE INVENTION

The present invention relates to an improved structure for a clutch brake and to a method for manufacturing such a clutch brake. Powdered metal, such as powdered steel, is initially pressed into a preform having a desired configuration for each of a pair of opposed covers for the clutch brake. The configuration of the outer surface of each of the preforms includes a plurality of embossed segments arranged in an annular array. The embossed segments of the covers are the portions thereof which are frictionally engaged during use. Each of the segments is defined by inner and outer circumferentially extending sides connected by a pair of generally radially extending ends. The intermediate portions of both of the ends can be curved circumferentially inwardly toward one another to form a concave region. Each preform is placed in a sintering oven for a predetermined period of time. The sintering process causes the particles of the pressed powdered metal to fuse together, thus hardening the preform. During the sintering process, a diverse material may be impregnated within the relatively porous preform to alter the coefficient of friction of the embossed segments of the outer surface. To accomplish this, a piece of diverse material, such as copper or bronze, is laid upon the preform adjacent each of the embossed segments. As the preform is sintered, the piece of diverse material melts and flows into the relatively porous preform. When the sintering process is completed, the preform has been hardened into the cover for the clutch brake, and the segments of the cover include the diverse material which has been impregnated therein.

It is an object of the present invention to provide an improved structure for a clutch brake having a plurality of embossed segments formed integrally therewith.

It is another object of the present invention to provide an improved method for manufacturing such a clutch brake structure.

It is a further object of the present invention to provide a clutch brake structure including localized regions of a diverse material impregnated in the embossed segments.

Other objects and advantages of the present invention will become apparent to those skilled in the art from the following detailed description of the preferred embodiments, when read in light of the accompanying drawings.

BRIEF DESCRIPTION OF THE DRAWINGS

FIG. 2 is an end elevational view of the outer surface of one of the covers of the clutch brake illustrated in FIG. 1.

FIG. 3 is a sectional elevational view taken along line 3—3 of FIG. 2.

FIG. 4 is a sectional elevational view, partially broken away, of a preform and a piece of diverse material in a sintering oven prior to being sintered to form the cover illustrated in FIG. 2.

DETAILED DESCRIPTION OF THE PREFERRED EMBODIMENTS

Figure 1:
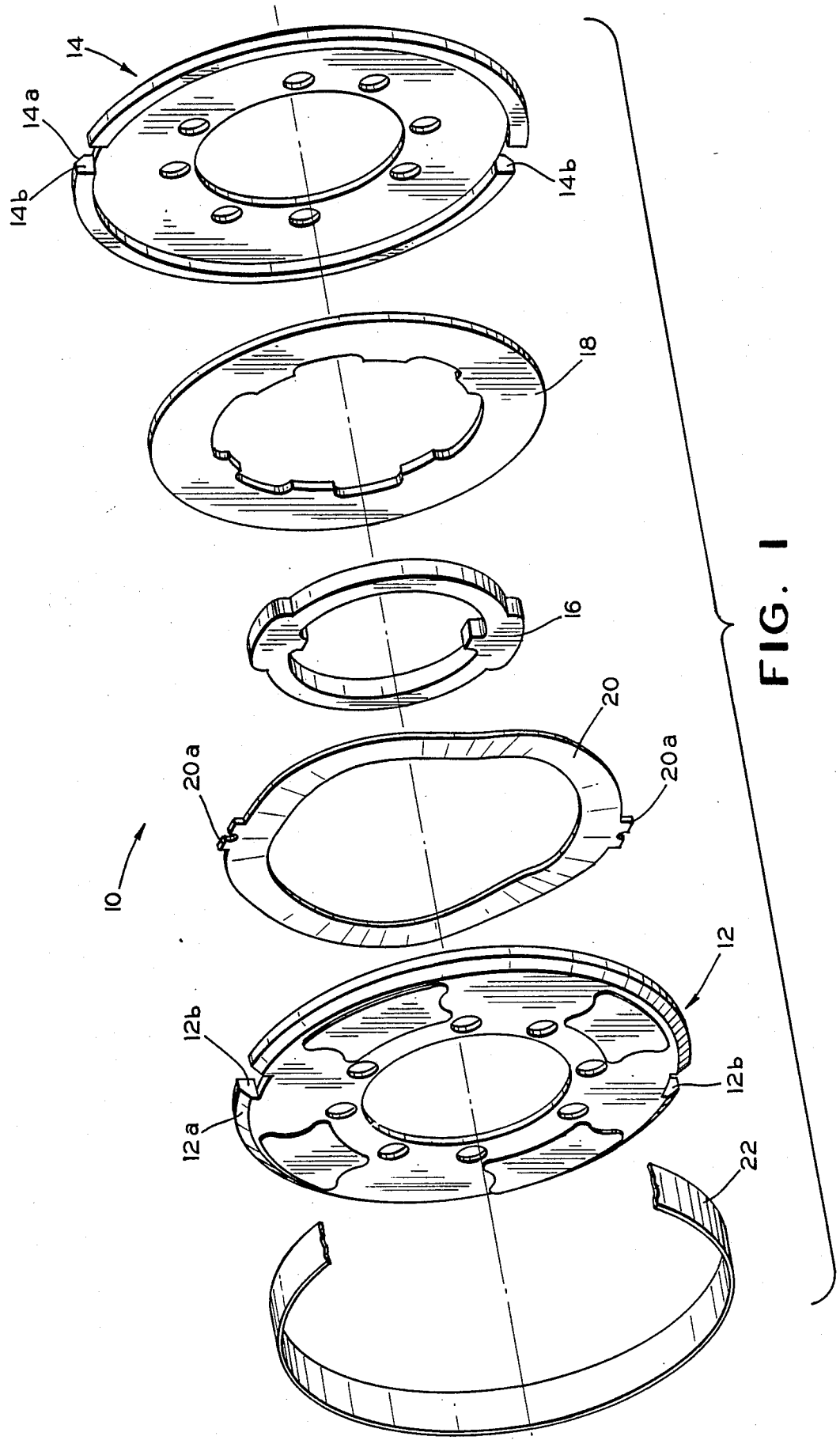
FIG. 1 is an exploded perspective view of an improved clutch brake in accordance with the present invention.
Figure 5:
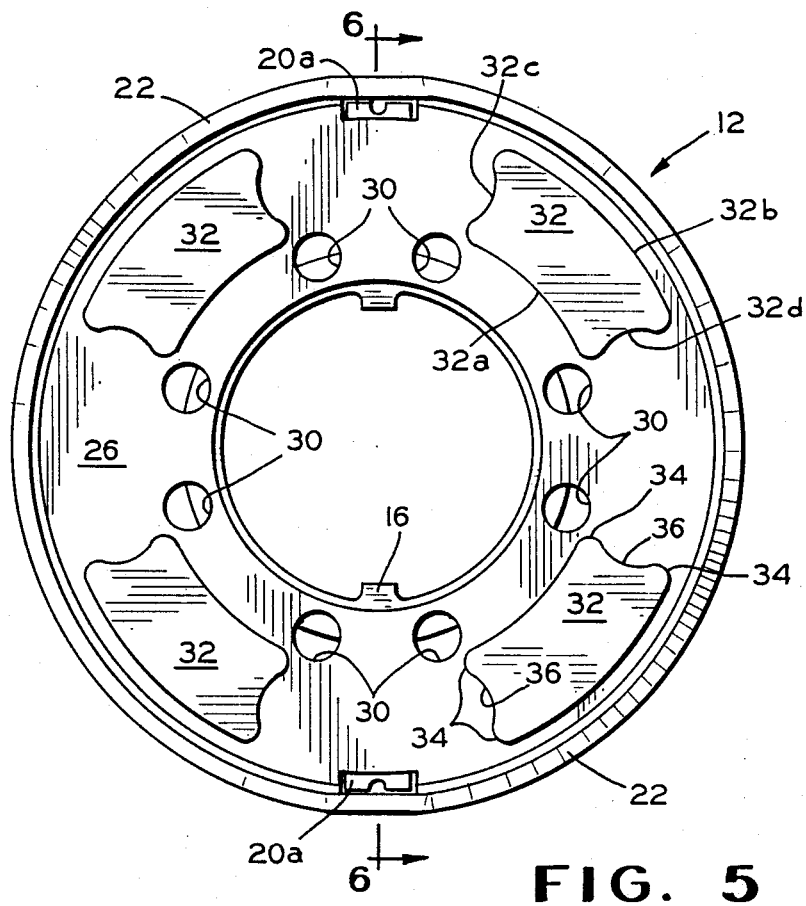
FIG. 5 is an end elevational view, similar to FIG. 2, showing the assembled clutch brake.
Figure 6:
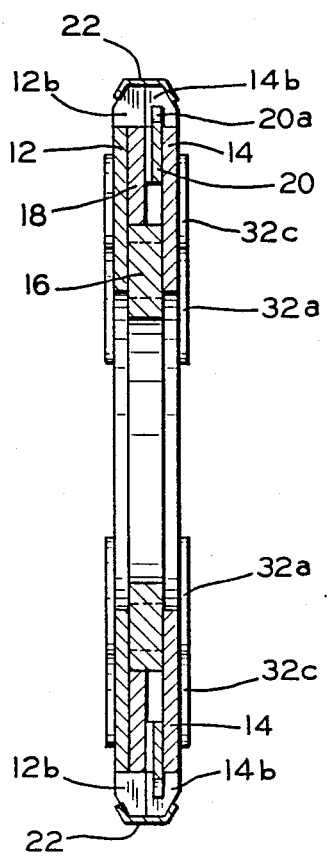
FIG. 6 is a sectional elevational view taken along line 6—6 of FIG. 5.

Referring now to the drawings, there is illustrated in FIG. 1 an exploded view of a clutch brake, indicated generally at 10, in accordance with the present invention. The clutch brake 10 includes a pair of opposed covers, indicated generally at 12 and 14, which are adapted to surround and enclose an inner brake washer 16, an outer brake washer 18, and a wave washer 20. The covers 12 and 14 include respective outer beveled edges 12a and 14a which permit a clamping band 22 to be crimped thereover (see FIGS. 5 and 6) to secure the covers 12 and 14 together. The outer covers 12 and 14 further include respective pairs of opposed slots 12b and 14b formed in the outer beveled edges 12a and 14a. When the covers 12 and 14 are secured together, the slots 12b and 14b define opposed spaces for receiving respective radially outwardly extending tabs 20a formed on the wave washer 20. The cooperation of the tabs 20a within the spaces defined by the slots 12b and 14b prevents the wave washer 20 from rotating relative to the covers 12 and 14. U.S. Patent Application Ser. No. 785,915, filed Oct. 9, 1985, now U.S. Pat. No. 4,657,124 is owned by the assignee of the present invention and discloses the basic structure and operation of the clutch brake 10, and such disclosure is hereby incorporated by reference.

Referring now to FIGS. 2 and 3, the structure of the cover 12 is illustrated in detail. The structure and construction of the cover 14 is identical to that of the cover 12 and, therefore, is not illustrated or described for the sake of brevity. The major portion of the cover 12 is generally annular in shape, having a relatively large central aperture 24 formed therethrough. The cover 12 has an outer facing surface 26, which is adapted to be frictionally engaged during use as described below, and a recessed inner facing surface 28. When the covers 12 and 14 are secured together, the inner facing surfaces 28 define an internal annular cavity which enclose the inner brake washer 16, the outer brake washer 18, and the wave washer 20 in the orientation illustrated in FIG. 1. A plurality of relatively small apertures 30 may also be formed through the cover 12 adjacent the central aperture 24.

A plurality of embossed segments 32 are formed on the outer facing surface 26 of the cover 12. The embossed segments 32 define individual raised areas on such outer facing surface 26 which are separated by the non-raised areas extending radially therebetween. The number of such embossed segments 32, as well as their relative size, shape, and location may be varied according to specific applications for the clutch brake 10. In the illustrated embodiment, four segments 32 are formed equidistantly in an annular array about the outer surface 26 of the cover 12. Each of the segments 32 is shaped generally in the form of a truncated sector, defined by an inner circumferentially extending side 32a, an outer circumferentially extending side 32b, and a pair of generally radially extending ends 32c and 32d. The ends 32c and 32d are contiguous with both the inner circumferential wall 32a and the outer circumferential wall 32b by means of convex-shaped corners 34. The two convex corners 34 associated with each of the ends 32c and 32d define a radius extending from an axis of rotation 36 of the clutch brake 10. The two radii associated with each of the segments 32 may be oriented at an angle of forty-five degrees relative to one another, and the radius associated with the end 32c of one of the segments 32 may be oriented at an angle of forty-five degrees relative to the radius associated with the adjacent end 32d of the adjacent segment 32.

Between the pair of convex corners 34 associated with each of the ends 32c and 32d, an intermediate portion 36 is defined for each of the ends 32c and 32d. The intermediate portions 36 of each of the ends 32c and 32d can be curved circumferentially inwardly toward one another to form a concave region. The concave intermediate regions 36, therefore, are disposed between the respective pairs of convex corners 34 associated with each of the ends 32c and 32d. The concave intermediate regions 36 may be formed symmetrically about a circumferential center line extending through the segment 32 which is disposed concentrically relative to the inner and outer circumferential sides 32a and 32b, respectively, and is located radially equidistantly therebetween. By shaping the segments 32 in this manner, a more uniform temperature distribution is achieved throughout the segments 32 when they are frictionally engaged during use.

When the release mechanism of the clutch is moved to the disengaged position, it exerts a predetermined amount of force axially against the clutch brake 10. As a result, the clutch brake 10 is squeezed between the release mechanism of the clutch and the forward end of the transmission. Because of their embossed or raised formation, the segments 32 are the only portions of the covers 12 and 14 which are frictionally engaged between the release mechanism and the transmission. Consequently, the axial forces generated by the release mechanism and the transmission cause pressures to develop on the segments 32 of the outer facing surfaces 26, which pressures are directed axially inwardly. The unit pressure developed on any portion of the segments 32 is greater than would otherwise be developed if the segments 32 were replaced by a continuous annular band extending about the clutch brake 10. This is because the segments 32 define a smaller effective area of the covers 12 and 14 against which the axial forces are applied than a continuous annular band would define. Since pressure is a function of force per unit area and the axial forces themselves remain constant while the area is decreased, the unit pressures (as well as the overall pressure) which are developed on the segments 32 are greater than the unit pressures which would otherwise have been developed on a continuous annular band.

Thus, the structure of the present invention provides for relatively greater unit pressures to be developed against relatively lesser surface areas of the segments 32 of the covers 12 and 14, as opposed to relatively lesser unit pressures being developed against relatively greater surface areas of covers of prior art clutch brakes. Such a structure results in several distinct advantages. First, by reducing the areas of the covers 12 and 14 which are subjected to frictional engagement into discrete regions, the segments 32 tend to wear more evenly. It would be difficult and expensive to manufacture a clutch brake wherein the annular friction bands are sufficiently true throughout their extents that they define planar surfaces which will wear evenly. By reducing the total area exposed to the frictional engagement and by dividing such reduced area into discrete segments 32, the undesirable effects of manufacturing inaccuracies are reduced, and the surfaces of the segments 32 will tend to wear more evenly during use.

Also, the regions in which wear will occur are precisely and easily defined by the shape of the segments 32.

A second advantage of the structure of the present relates to the dissipation of heat generated by the frictional engagement of the clutch brake 10. As would be expected, heat is generated in the segments 32 when they are frictionally engaged between the release mechanism and the transmission. The portions of the outer surface 26 of the cover 12 which extend radially between the segments 32 act as heat sinks to draw heat away from the segments 32. In clutch brakes having an annular friction band, there are no radially extending portions which are not themselves frictionally engaged and, therefore, do not generate additional heat. Thus, even though the amount of heat which is generated in localized areas (i.e., the segments 32) of the clutch brake 10 of the present invention may be somewhat greater than would be generated in an annular friction band (because of the lesser overall pressures generated therein), the present invention provides a superior structure because it is able to dissipate such heat much more effectively than the clutch brake having such an annular friction band. Consequently, the clutch brake 10 of the present invention can safely absorb and dissipate more heat than such a clutch brake, resulting in a more durable and reliable device.

A third advantage of the present invention arises from the second advantage described above. Since the portions of the outer facing surface 26 of the cover 12 which extend between the segments 32 are not frictionally engaged, any heat therein arises only from the dissipation of the heat generated in the segments 32. Under normal circumstances, such dissipated heat will be less than would normally occur in clutch brakes having annular friction bands, wherein the entire circumference of the band is frictionally engaged. When the clutch brake 10 is assembled, the wave washer 20 abuts the inner facing surface 28 of the cover 12 only at certain predetermined points about its circumference. As best illustrated in FIG. 1, the wave washer 20 can be formed having four waves such that each of the waves abuts the inner facing surface 28 of the cover 12 at a point which is located between the segments 32. Since the amount of heat at such points is relatively low, the operation of the wave washer 20 is not substantially affected by heat. In clutch brakes having annular friction bands, the flexibility of the wave washer 20 may change as the amount of heat generated in the inner facing surface 28 of the cover 12 increases at the points of abutment. If the flexibility of the wave washer 20 is affected, it may result in undesirable variations in the amount of force generated by the wave washer 20. Since the points of abutment in the clutch brake 10 of the present invention are not located in areas of heat generation, the operation of the wave washer 20 is not substantially affected.

The present invention also relates to an improved method for forming the covers 12 and 14 described above. Initially, a preform 40 (See FIG. 4) is formed having a shape which is identical in configuration to the shape of the cover 12 illustrated in FIGS. 1, 2, and 3. The preform 40 is formed from powdered metal material, such as powdered steel or powdered iron. Such powdered metal is commonly available from commercial sources. To form the preform 40, a quantity of such powdered metal is placed in a conventional die (not shown) and is subjected to a relatively large pressure by a conventional press or similar machine. The amount of pressure required to form the preform 40 will vary depending upon the type of powdered metallic material used and with the geometry of the preform 40. For example, a three hundred fifty ton force has been found to be acceptable to form a preform 40 from powdered steel which is approximately four inches in diameter. The preform 40 formed by the process is relatively porous and somewhat brittle, but it is shaped to conform to the configuration of the covers 12 and 14.

Once the preform 40 has been fabricated, it is placed in a conventional sintering oven 42 for a predetermined period of time. Similar to above, the temperature and length of time for the sintering process will vary with the type of powdered metallic material used and with the geometry of the preform 40. For the preform 40 described above, the sintering process can be performed at a temperature of approximately two thousand degrees Fahrenheit for approximately twenty minutes. The sintering process causes the particles of the pressed powdered metal of the preform 40 to fuse together, thus hardening the preform 40 into the cover 12.

The coefficient of friction of the segments 32 will determine the amount of the frictional force generated by such engagement, assuming that the other factors involved (such as the coefficients of friction for the engaging faces of the release mechanism and the transmission and magnitude of the axial forces urging the components together) remain constant. The coefficient of friction of the segments 32 is determined in large part by the composition of the powdered metal utilized to form the segments 32. Thus, by varying such composition, the coefficient of friction of the segments 32 can be altered to achieve desired results. However, since it is only the segments 32 themselves which are involved in the frictional engagement, it may be desirable to vary only the composition of the segments 32, as opposed varying the composition of the entire preform 40 and, thus, the cover 12.

In order to do this, the present invention contemplates that a diverse material, such as metal or oil, be impregnated in the segments 32 during or following the sintering process. To accomplish this, a piece 44 of such diverse material (copper, for example) is laid upon the preform 40 in the sintering oven 42, as illustrated in FIG. 4. Typically, the piece 44 has a melting temperature which is less than or equal to the temperature at which the preform 40 will be sintered. As the temperature of the preform 40 is heated, the piece 44 melts into liquid form, permitting it to flow into and infiltrate the relatively porous material constituting the preform 40. When copper is utilized to form the piece 44 and powdered steel is utilized to form the preform 40, the piece 44 can be laid upon the preform 40 as soon as the preform 40 is inserted within the sintering oven 42 and can be sintered for the entire twenty minute period described above. This is because the melting temperature of copper is approximately equal to the sintering temperature for the powdered steel.

When bronze is utilized to form the piece 44, the preform 40 can be sintered first as described above without the piece 44. Once the preform 40 has been sintered, it is removed from the sintering oven 42 and cooled. Subsequently, the piece is laid upon the sintered preform 40 as shown in FIG. 4 and re-inserted in the sintering oven 42. The preform 40 and the piece 44 are heated to a temperature of approximately fifteen hundred degrees Fahrenheit for a period of approximately five minutes. That temperature is approximately the melting point of the bronze piece 44. Once the bronze piece 44 melts, it flow into the relatively porous preform 40 as described above. If a liquid material, such as oil, is desired to be impregnated within the preform 40, it is merely added to the preform 40 in the desired regions after the preform 40 is sintered as described above. The re-heating process is unnecessary because the liquid material does not, of course, need to be melted.

Thus, it can be seen that the coefficient of friction of the segments 32 of the covers 12 and 14 can be varied by changing the type and amount of diverse material which is impregnated therein. The temperatures and times described above will vary, depending upon the type of diverse material utilized, the degree of infiltration of the diverse material required to be achieved, and the ultimate coefficient of friction which is desired.

In accordance with the provisions of the patent statutes, the principle and mode of operation of the present invention have been explained and illustrated in its preferred embodiments. However, it must be understood that the present invention may be practiced otherwise than as specifically explained and illustrated without departing from its spirit or scope.

What is claimed is:

1. A clutch brake comprising:
a pair of opposed covers, each of said covers including an outer facing surface and an inner facing surface, each of said outer facing surfaces including a plurality of embossed segments separated by non-raised areas, each of said inner facing surfaces including a flat recessed portion extending throughout said inner facing surface, said covers being secured together such that said inner facing surfaces define an internal cavity;
inner and outer brake washers disposed within said cavity; and
a wave washer disposed within said cavity, said wave washer including a plurality of waves, each of which abuts one of said inner facing surfaces only opposite one of said non-raised areas of said outer facing surface.

2. The invention defined in claim 1 further including means for preventing rotation of said wave washer relative to said covers.

3. A clutch brake comprising:
a pair of opposed covers, each of said covers including an outer facing surface and an inner facing surface, each of said outer facing surfaces including a plurality of embossed segments separated by non-raised areas, said covers being secured together such that said inner facing surfaces define an internal cavity;
inner and outer brake washers disposed within said cavity;
a wave washer disposed within said cavity, said wave washer including at least one wave which abuts one of said inner facing surfaces; and
means for maintaining said wave washer in a predetermined position relative to said one of said inner facing surfaces such that said wave abuts said one of said inner facing surfaces only opposite one of said non-raised areas of said outer facing surface.

4. The invention defined in claims 3 wherein said wave washer includes a plurality of waves, each of which abuts said one of said inner facing surfaces only opposite one of said non-raised areas of said outer facing surface.

5. The invention defined in claim 3 wherein said means for maintaining includes at least one tab formed on said wave washer.

6. The invention defined in claim 5 wherein said means for maintaining further includes at least one slot formed in one of said covers, said tab cooperating with said slot for maintaining said wave washer in a predetermined position relative thereto.

7. A clutch brake comprising:
brake washer means adapted to be mounted on a shaft for rotation therewith;
first and second covers having respective outer circumferential surfaces and respective pluralities of embossed friction segments thereon, said friction segments adapted to be selectively engaged by a stationary member when it is desired to stop the shaft from rotating, said covers enclosing and frictionally engaging said brake washer means while being rotatable relative thereto; and
clamping band means extending over said outer circumferential surfaces to secure said covers together.

8. The invention defined in claim 7 wherein said outer circumferential surfaces are beveled.

9. The invention defined in claim 7 wherein said first and second covers have identical shapes.

10. A method for forming a clutch brake comprising the steps of:
(a) providing a brake washer means, including means for coupling the brake washer means to a shaft for rotation therewith, for braking rotation of the shaft;
(b) providing first and second covers having respective outer circumferential surfaces and friction surfaces, the friction surfaces adapted to be selectively engaged by a stationary member when it is desired to stop the shaft from rotating;
(c) orienting the covers so as to enclose and frictionally engage the brake washer means while being rotatable relative thereto; and
(d) crimping a clamping band means over the outer circumferential surfaces to secure the covers together.

11. The invention defined in claim 10 wherein step (b) further includes the step of providing beveled edges on the outer circumferential surfaces of the first and second covers so that the clamping band means may be crimped thereover.

12. The invention defined in claim 10 wherein step (b) further includes the step of providing respective pluralities of embossed friction segments on the first and second covers, the friction segments adapted to be selectively engaged by the stationary member when it is desired to stop the shaft from rotating.

* * * * *